(12) United States Patent
Annampedu et al.

(10) Patent No.: US 6,912,099 B2
(45) Date of Patent: Jun. 28, 2005

(54) MAXIMUM LIKELIHOOD DETECTION OF ASYNCHRONOUS SERVO DATA EMPLOYING INTERPOLATION

(75) Inventors: Viswanath Annampedu, Schnecksville, PA (US); Pervez M. Aziz, Garland, TX (US)

(73) Assignee: Agere Systems Inc., Allentown, PA (US)

( * ) Notice: Subject to any disclaimer, the term of this patent is extended or adjusted under 35 U.S.C. 154(b) by 225 days.

(21) Appl. No.: 10/436,526

(22) Filed: May 13, 2003

(65) Prior Publication Data

US 2004/0228019 A1 Nov. 18, 2004

(51) Int. Cl.[7] .............................................. G11B 20/10
(52) U.S. Cl. .............................. 360/39; 360/65; 360/46
(58) Field of Search .............................. 360/39, 46, 65

(56) References Cited

U.S. PATENT DOCUMENTS 5,835,295 A * 11/1998 Behrens ........................ 360/51
6,530,060 B1 * 3/2003 Vis et al. ...................... 714/792
6,657,802 B1 * 12/2003 Ashley et al. ................. 360/51
2004/0136477 A1 * 7/2004 Annampedu et al. ....... 375/340

FOREIGN PATENT DOCUMENTS

EP 1274071 A2 8/2003

* cited by examiner

*Primary Examiner*—David Hudspeth
*Assistant Examiner*—Varsha A. Kapadia

(57) ABSTRACT

A repeatable run-out (RRO) detector employs one or more digital interpolators to interpolate asynchronous sample values representing an RRO address mark (AM) and RRO data, an asynchronous maximum-likelihood (AML) detector to detect the RRO AM, and a RRO data decoder to decode the RRO data. The AML detector employs an AML algorithm, such as a Viterbi algorithm, to detect the series of peaks of the RRO AM based on detection of the entire sequence of observed peaks. AML detection selects one of either the asynchronous or interpolated sample sequences that are closest in distance to the ideal RRO AM sample sequence. Once the RRO AM is detected, the AML detector provides a RRO AM found signal as well as the selected one of the sample sequences having the best phase for detecting and decoding the RRO data.

37 Claims, 9 Drawing Sheets

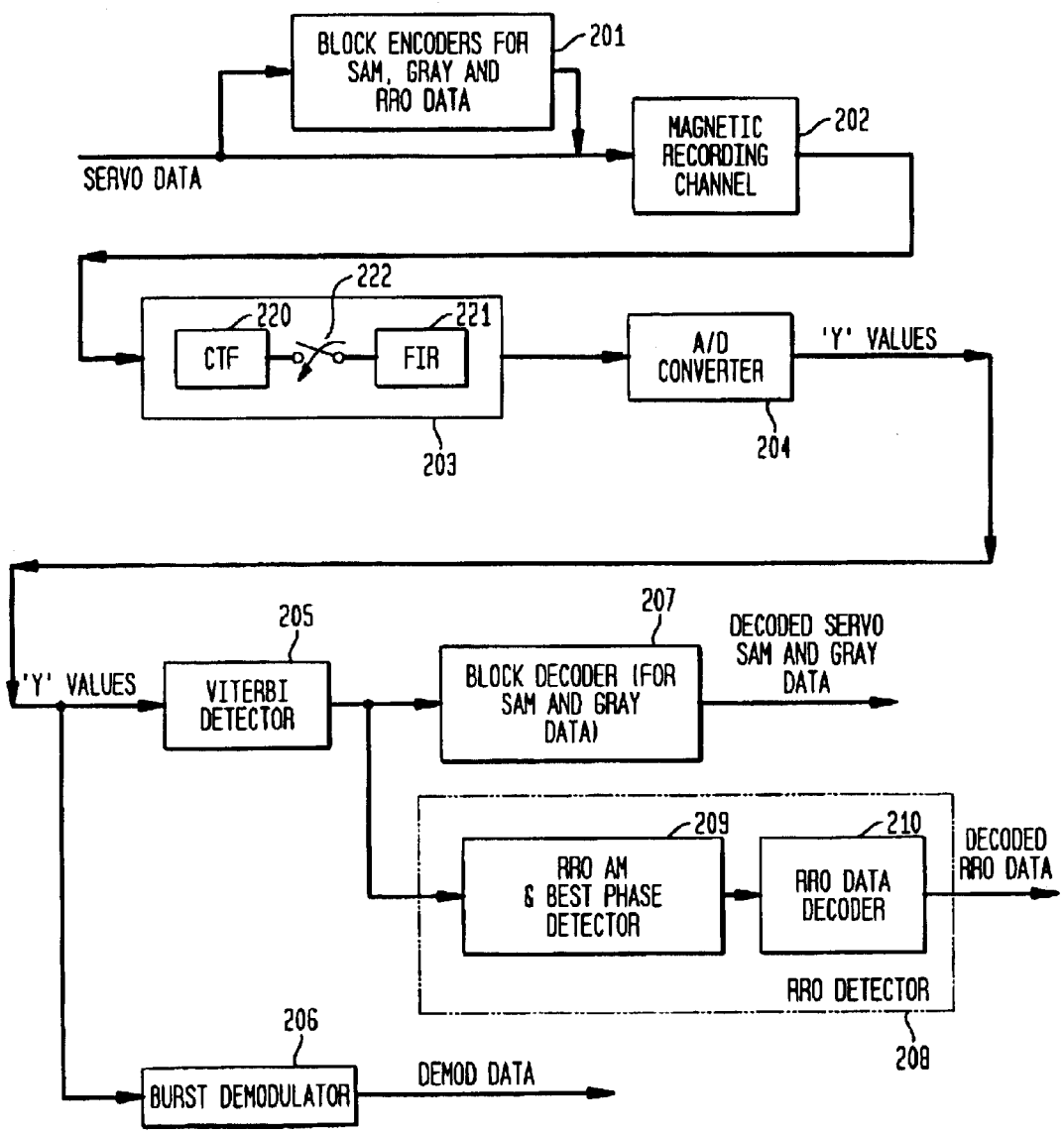

MAXIMUM LIKELIHOOD DETECTION OF ASYNCHRONOUS SERVO DATA EMPLOYING INTERPOLATION

BACKGROUND OF THE INVENTION

1. Field of the Invention

The present invention relates to detection of data in a communications system, and, more particularly, to detection of servo repeatable run out (RRO) information from a channel.

2. Description of the Related Art

A read channel integrated circuit (IC) is a component of a modem hard disk drive, such as a hard disk drive found in many PCs. A read channel component converts and encodes data to enable the (e.g., magnetic) recording head(s) to write data to the disk and then read back the data accurately. The disks in a hard disk drive typically include many tracks containing encoded data, and each track comprises one or more of user, (or "read") data sectors as well as "servo" data sectors embedded between the read sectors. The information of the servo sectors aids in positioning the magnetic recording head over a track on the disk so that the information stored in the read sectors may be retrieved accurately.

Repeatable run out (RRO) refers to a phenomenon that occurs due to an imperfect spindle upon which the disk rotates. An imperfect spindle might not allow the disk in the hard drive to spin properly at the disk's center. If the disk is not rotating at the center, then the track rotating under the head will not follow a circular trajectory, and hence the head might not be able to read the servo information properly. A similar phenomenon occurs when spindle imperfections were present at the tine the servo information was written to the disk. Even though the disk may spin properly in a different hard disk drive while reading the servo information, since the information was not written properly on a circular track, the head might not be able to read the servo information accurately. Thus, there is a need for a mechanism to properly guide the head to follow the trajectory of the track. A RRO data field in the servo information serves this purpose.

FIGS. 1A–1D illustrate one form of RRO (termed a one "f" run out) that results from an imperfect spindle. FIG. 1A shows radial position versus error when the error is zero, corresponding to the head tracking in a circular trajectory as shown by the dashed circle 102 on disk 103 of FIG. 1B. As shown in FIG. 1C, the error for one "f" run out varies as a function of the radial position, but the error at a given position repeats after one revolution of the disk. As shown in FIG. 1D, the one "f" run out results from the head tracking an oval path, shown by the dashed path 104 on disk 103. Since the error "repeats" itself from one revolution to another, techniques may be devised to compensate for the problem. By feeding positioning information about the "repeatable" error to servo control circuitry, the error may be corrected to position the head properly over the servo track. State of the art magnetic recording systems employ digital signal processing to detect servo data as opposed to older systems employing analog techniques.

FIG. 2 shows a conventional magnetic recording system of the prior art. Servo data is encoded by block encoders 201. Block encoders 201 may represent several different encoders associated with different fields of the servo data. The encoded servo information is written to the disk (or other recording medium) as servo sector information.

FIG. 3 shows the format of servo sector information 300. The servo sector information 300 comprises preamble 301 (e.g., a 2T pattern) that allows the system to recover the timing and gain of the written servo data. Preamble 301 may be followed by encoded servo address mark (SAM) 302, which is generally an identical identification address (fixed number of bits) for all servo sectors. SAM 302 may then be followed by encoded Gray data 303. Gray data 303 represents track number/cylinder information and may be employed as coarse positioning information for the magnetic head. Gray data 303 is followed by one or more burst demodulation fields 304. Burst demodulation fields 304 are employed as fine positioning information for the head over the track. Burst demodulation fields 304 are followed by RRO data field 305. Information in RRO data field 305 provides head positioning information to correct for RRO, which information is finer than that provided by the Gray data and coarser than that provided by the burst demodulation fields.

The format of RRO data field 305 is shown in FIG. 4. RRO data field 305 begins with DC erase 401, which is a predefined pattern that is generally either an all-zeros or an all-ones pattern. DC erase 401 is followed by RRO address mark (AM) 402, which is a bit pattern that is the same for all servo sectors. RRO AM 402 indicates when to start decoding RRO data and aids selection of the best sampling phase for decoding RRO data 403. RRO AM 402 is followed RRO data 403, which includes head-positioning information. RRO data 403 is followed by parity field 404, which includes parity bits employed for error detection/correction. Parity field 404 is followed by toggle bit 405, which brings the magnetization level back to whatever magnetization level the disk used in DC erase 401.

The servo preamble, SAM, Gray data, and burst demodulation fields are typically written by a servo track writer. However, the RRO data field following the last burst demodulation field is typically written by the read channel component. For detecting the servo preamble, SAM, Gray data, and demodulation fields, a digital phase-locked loop (DPLL) acquires the proper sampling phase based on the timing information provided by the preamble. However, for RRO detection, it is not desirable to write a preamble for format efficiency reasons. Hence, a detector does not know a priori the proper sampling phase (timing) to read the RRO information. Thus, reading RRO information is an "asynchronous" data detection process. Also, detection of the RRO address mark is prone to detection errors because the RRO detector may begin detection in the DC erase field without the proper sampling phase (i.e., there is no preamble to guide the timing loop). The number of detection errors increases when fewer bits are written as the RRO address mark for format efficiency reasons.

Returning to FIG. 2, the encoded servo information is read back by a magnetic recording head. Together, the process of writing to, storing on, and reading from the disk by the recording head may be modeled as magnetic recording channel 202. Data read from the disk is referred to as readback data. The readback data is equalized to a desired target partial response by equalizer 203 comprising continuous time filter (CTF) 220 followed by discrete time, finite impulse response (FIR) filter 221. Sampling of the signal from CTF 220 (shown in FIG. 2 by switch 222) is synchronous using the timing information from a DPLL (not shown in FIG. 2) when servo Gray and demodulation burst data are read, but is asynchronous when RRO data is read. The output of equalizer 203 is digitized and quantized by A/D converter 204, whose output is shown as 'Y' values.

The Y values are applied to Viterbi detector 205, which is a partial-response maximum-likelihood (PRML) detector. Constraints imposed by the servo encoder of block encoder 201 may be employed in the design of the Viterbi detector to decode the servo data optimally. The output of Viterbi detector 205 is applied to block decoder 207 to generate decoded SAM and Gray data. The output of Viterbi detector 205 (which Viterbi detector might employ a pruned trellis to enforce the coding constraints of the RRO encoder) is also applied to RRO detector 208. RRO detector 208 includes RRO address mark (AM) & best phase (BP) detector 209, which detects the RRO address mark and simultaneously detects the BP (corresponding to the middle phase bit of the RRO codeword). RRO data decoder 210 of RRO detector 208 employs the RRO AM and the BP to select samples for decoding into RRO data. The 'Y' values are also passed on to burst demodulator 206 to generate fine positioning information for the head over the track.

Other detectors employed for detection of servo information include peak detectors. In peak detectors, location and polarity of the peak (which are dependent on servo encoder constraints) serve to enable decoding of the data. The output of the peak detector may also be fed to an RRO detector for detecting the RRO information. Both peak and Viterbi detectors give very good performance when they use properly sampled signals for detecting the bits. The performance of these detectors degrades significantly when the samples are generated with timing errors.

An RRO encoder (such as included in block encoders 201) might transform each one-bit value of the RRO data into 3-bit values by repeating the one-bit value three times (i.e., "1" goes to "111" and "0" goes to "000"). If the constraint that no two transitions are adjacent is imposed on detection of encoded RRO data (termed a d=1 constraint and often employed for non-return-to-zero (NRZ) line coding), the trellis employed by Viterbi detector 205 is pruned to enforce this constraint (i.e., the constraint that neither "010" nor "101" bit patterns are allowed within the output bit stream of the Viterbi detector). Enforcing the d=1 constraint in a 16-state Viterbi detector defines the invalid states for d=1 constraint as 0010, 0100, 0101, 1101, 1011, 1010. The valid states for d=1 constraint are 0000, 0001, 0011, 0110, 0111, 1111, 1110, 1100, 1001, and 1000.

FIG. 5 shows pruning of the trellis of the Viterbi detector with the d=1 constraint. The left column represents the 16 possible states at time [k−1], and the right column represents the 16 possible states at time [k]. The bit-pattern in each state represents the four bits currently in the detector, with the least significant bit (LSB) representing the most recently received bit (i.e., the LSB of a state at time [n−1] is $Y_{[n-1]}$). Thus, a single bit cycle is shown. In general, transitions from invalid states in the left column are pruned (have no transitions) to the right column, with the exception of states 2 (0010) and 13 (1101) whose transitions enable each state to be reached by at least one path. For these exceptions, the transitions are to invalid states that are pruned in the next cycle. Valid states having a pruned path are indicated by heavy solid lines, with the path from the valid to invalid state being pruned. Other valid states in the left column may permit transitions to invalid states in the right column to enable each state to be reached by at least one path. The transitions to invalid states are then pruned in the next cycle.

Since the sampling phase is not known when reading the RRO data field, a Viterbi detector is more prone to making errors. Due to the imposed d=1 constraint, only certain type of errors are possible. Since each bit is written thrice and because of the d=1 constraint in the Viterbi detector, the first and third bits are most likely to be affected, while the second (middle) bit is most likely to be preserved due to improper sampling phase. For example, an encoded user data stream of . . . 111 000 111 000 000 . . . input to the d=1 constraint pruned Viterbi detector is output as . . . 011 100 111 100 000 . . . (using the pruned 16-state trellis of FIG. 5). Identifying the middle bit detects the corresponding RRO data field. The RRO address mark is employed to identify which bits of the Viterbi detector output are the middle bits.

One technique of the prior art employed by RRO AM & BP detector 209 to identify middle bits, or the "middle phase" as the best phase, employs middle phase selection logic. For example, if 0101001 is the pattern used for RRO address mark, after encoding, this pattern becomes 000111000111000000111 (which is 21 bits). RRO sync and phase centering by detector 209 are accomplished by passing the data from the output of the pruned Viterbi detector through a sliding window. The data within the window is compared to the expected address mark for each phase of the bit (3T/bit, where T is the bit period). The RRO address mark is found when the number of mismatches is less than a threshold (or equivalently, the number of matching bits is greater than or equal to the threshold). For example, if no tolerance is allowed for errors in the read RRO address mark, then all 7 bits of the RRO address mark must match, and the threshold for the number of matching bits is set as 7. Phase centering (selecting which is the middle bit) is accomplished by evaluating the number of matches on adjacent phases.

FIG. 6 illustrates one technique of phase centering of the prior art used by RRO AM & BP detector 209 to detect the "middle phase" as the best phase. Data C is a bit stream output from the Viterbi detector. If "0101001" is the pattern used for the RRO address mark, then, after encoding, this pattern becomes 000111000111000000111, shown as the Data C bit stream. The Data B and Data A bit streams are the Data C bit stream delayed, in time, by one and two bit periods, respectively. The bit streams are passed through a sliding window 601 and compared to the expected RRO address mark value. The sliding window effectively produces the following operations at every bit period T: A=B, B=C, and C gets the next bit from the Viterbi detector. The RRO address mark value is found when the number of mismatches is less than a threshold, or, equivalently, the number of matches is greater than or equal to the threshold. For the example of FIG. 6, a threshold of 7 for the number of matching bits would require that no mismatches exist. Phase centering (i.e., detecting the middle-encoded bit) is accomplished by counting the number of matches in the adjacent phases.

Other techniques employ digital interpolation with bit peak detection to detect the series of peaks of the RRO AM on a peak-by-peak basis. One or more digital interpolators are employed to interpolate the asynchronous samples from the receiver's A/D converter to generate one or more interpolated samples in between the asynchronous samples. Thus, each digital interpolator generates an interpolated sample corresponding to some phase relative to that of the sample timing of the A/D converter. One aspect of interpolation employs a phase-locked loop with phase error detection to generate synchronous interpolated samples. Such method is described in U.S. Pat. No. 5,835,295 to Behrens entitled "Zero Phase Restart Interpolated Timing Recovery in a Sampled Amplitude Read Channel," filed Nov. 18, 1996, which is incorporated herein in its entirety by reference.

SUMMARY OF THE INVENTION

The present invention relates to repeatable run out data detection employing one or more digital interpolators to interpolate asynchronous sample values representing an address mark (AM) and data, an asynchronous maximum-likelihood (AML) detector to detect the AM, and a data decoder to decode the data. The AML detector employs an AML algorithm, such as a Viterbi algorithm, to detect the series of peaks of the AM based on detection of the entire sequence of observed peaks. AML detection selects one of either the asynchronous or interpolated sample sequences that are closest in distance to the ideal AM sample sequence. Once the AM is detected, the AML detector provides an AM-found signal as well as the selected one of the sample sequences having the best phase for detecting and decoding the data.

In accordance with one embodiment of the present invention, data in a sample sequence read from a recording channel are detected by generating one or more interpolated sample sequences from the read sample sequence, with each interpolated sample sequence having a different corresponding phase relative to the read sample sequence. A maximum-likelihood (ML) detection algorithm generates a distance measure between a portion of each sample sequence and an ideal sample sequence, wherein the ideal sample sequence corresponds to peaks in the data. Either the read sample sequence or one of the interpolated sample sequences is selected based on the minimum distance measure for use in detecting the data.

BRIEF DESCRIPTION OF THE DRAWINGS

Other aspects, features, and advantages of the present invention will become more fully apparent from the following detailed description, the appended claims, and the accompanying drawings in which:

FIG. 2 shows a conventional magnetic recording system of the prior art;

DETAILED DESCRIPTION

Figure 1A:
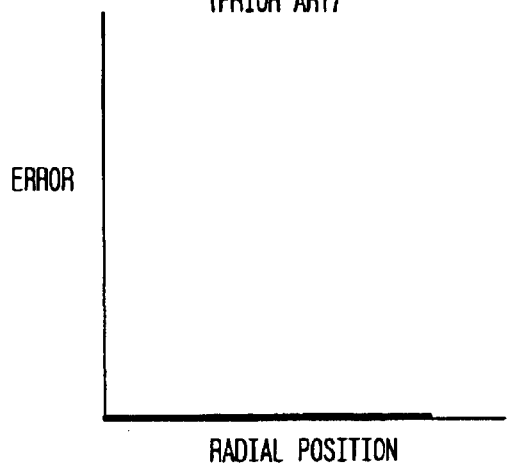
FIG. 1A shows radial position versus error of a head following a trajectory over a rotating disk when the error is zero.
Figure 1B:
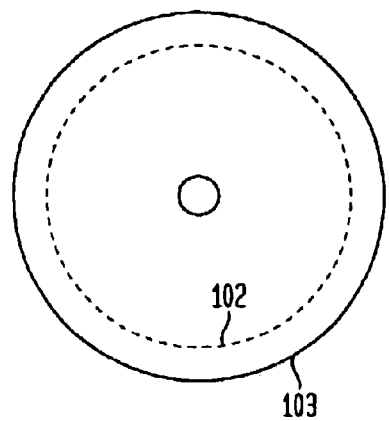
FIG. 1B shows the head tracking a circular trajectory for the graph of FIG. 1A.
Figure 1C:
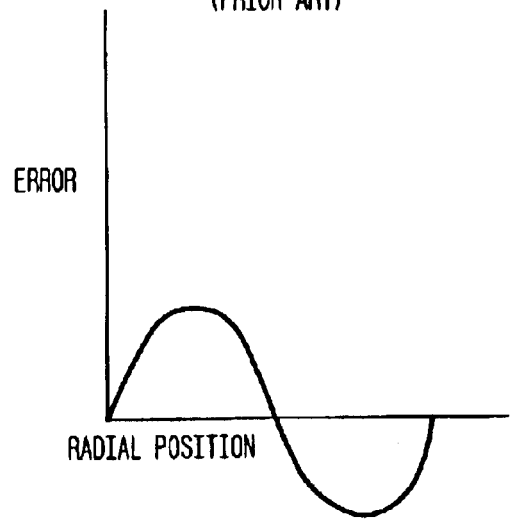
FIG. 1C shows radial position versus error of a head following a trajectory over a rotating disk for varying error that returns to zero after one revolution of the disk.
Figure 1D:
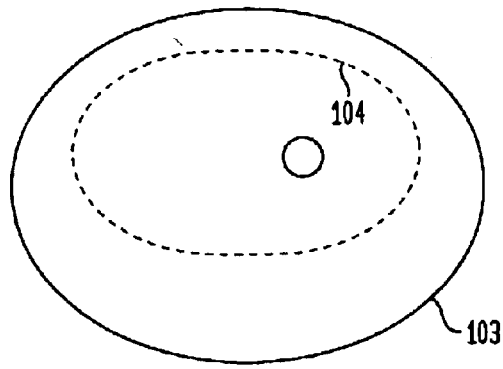
FIG. 1D shows a head tracking an oval path for the graph of FIG. 1C.
Figure 3:
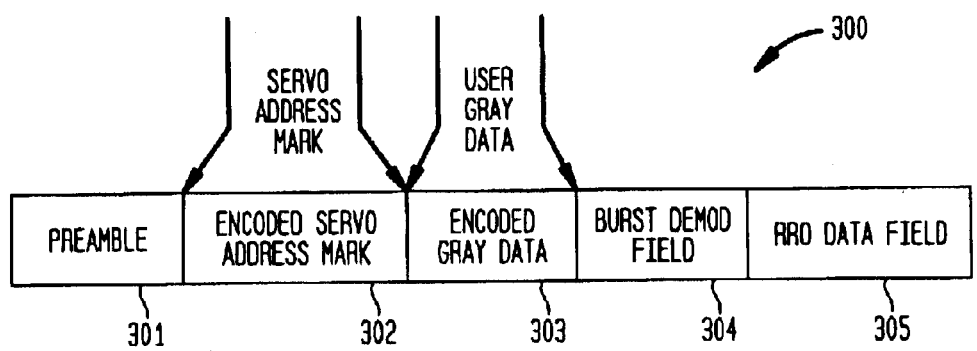
FIG. 3 shows a format for servo sector information employed with the magnetic recording system of FIG. 2.
Figure 4:
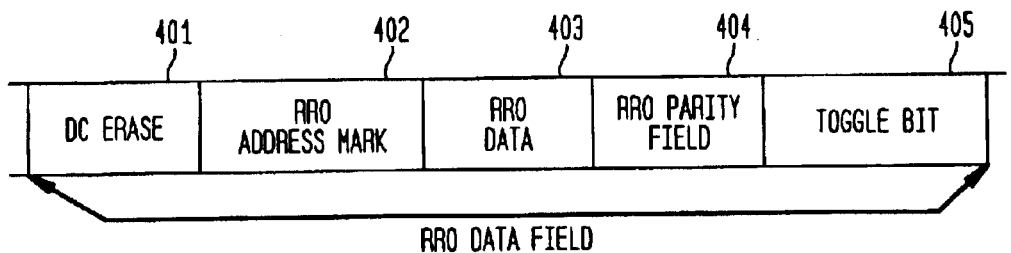
FIG. 4 shows the format of the repeatable run out (RRO) data field of FIG. 3.
Figure 5:
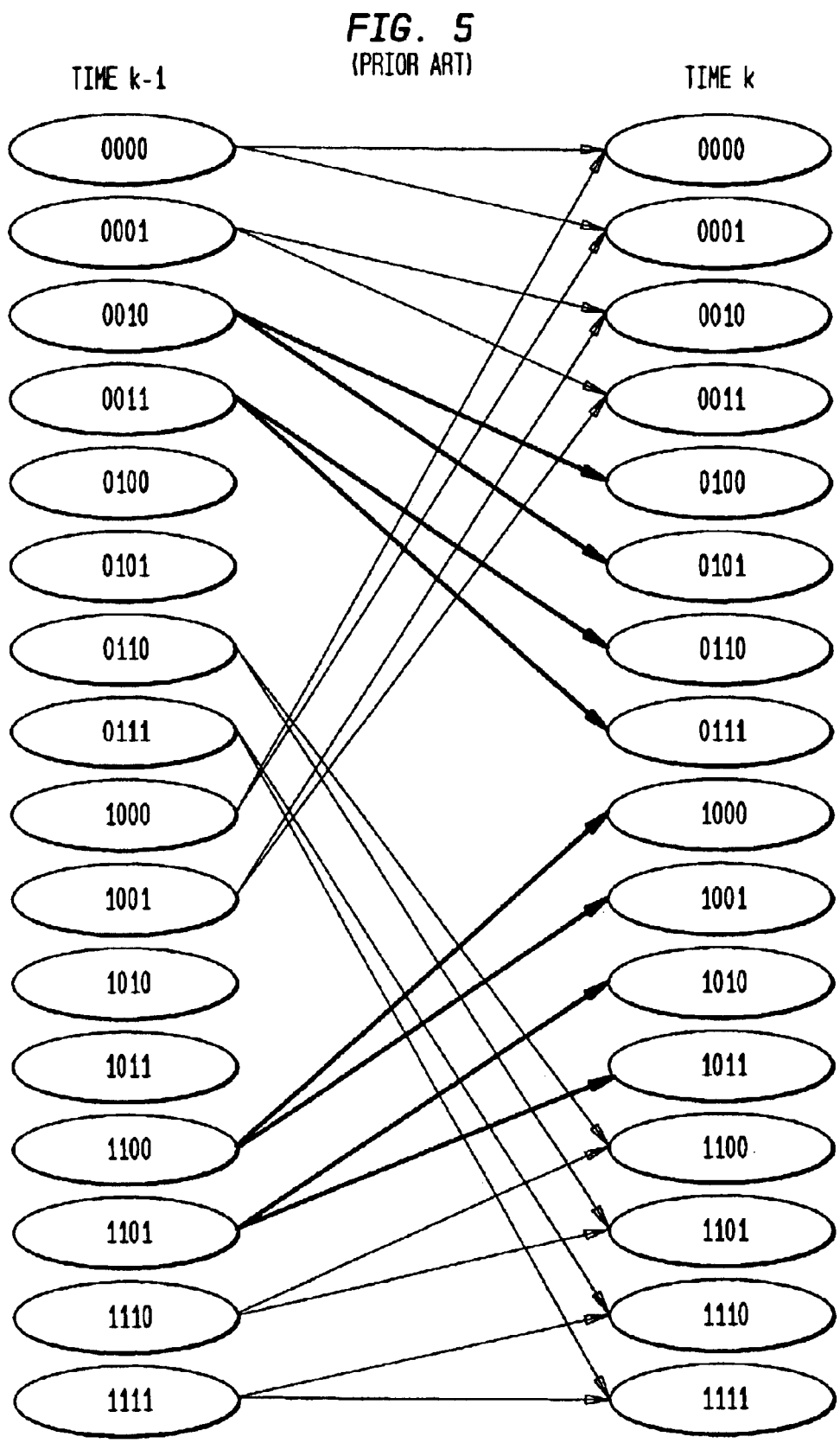
FIG. 5 shows a pruned trellis of the Viterbi detector of FIG. 2 to impose a d=1 constraint.
Figure 6:
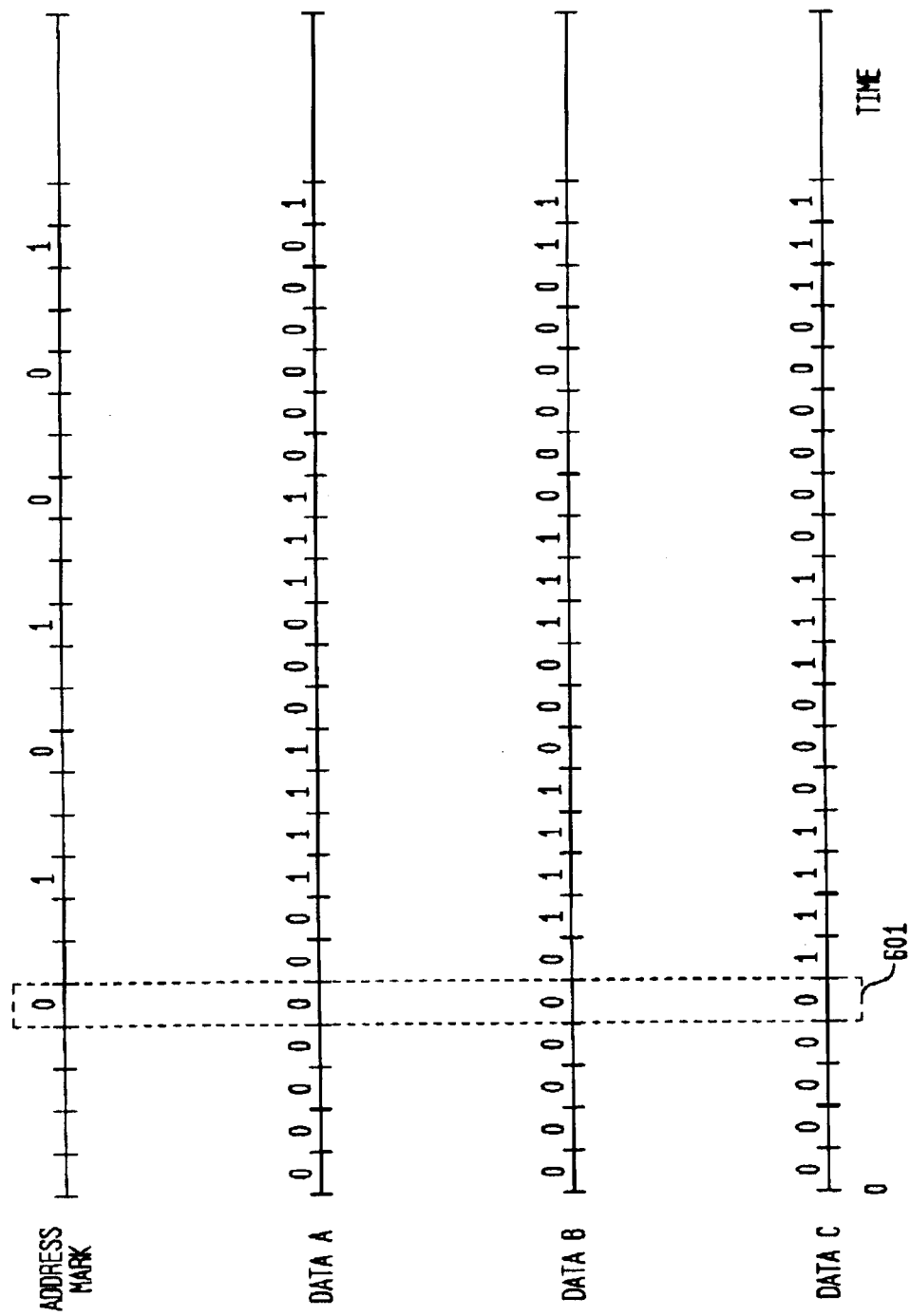
FIG. 6 illustrates setting a best phase based on the middle bit of the prior art.
Figure 7:
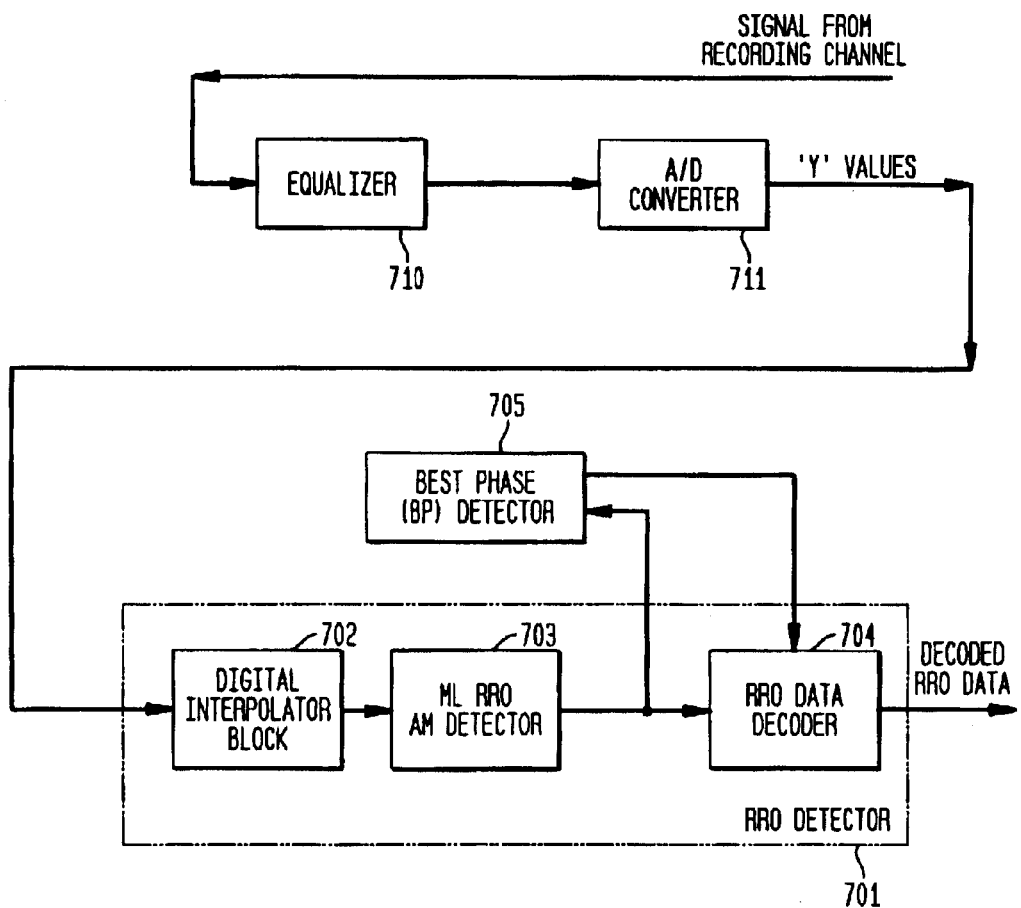
FIG. 7 shows a receiver including a repeatable run out (RRO) detector for detecting and decoding data in accordance with exemplary embodiments of the present invention.

FIG. 7 shows a receiver 700 including a repeatable run out (RRO) detector 701 for detecting and decoding RRO data field information in accordance with exemplary embodiments of the present invention. RRO detector 701 may detect and decode RRO data field information such as shown in FIG. 4, including RRO address mark (AM) and RRO data. Receiver 700 further comprises equalizer 710 and analog-to-digital (A/D) converter 711. Equalizer 710 applies equalization to a signal read from a magnetic recording medium, such as a magnetic recording disk, to compensate for effects of inter-symbol interference (ISI) and signal dispersion caused by the signal's passage through the magnetic recording channel (medium). The signal may be a series of symbols representing servo data, such as encoded SAM, Gray, and RRO data as shown in FIGS. 3 and 4. Equalizer 710 may include a switch (not shown in FIG. 7) to enable sampling of the analog signal. A/D converter 711 generates digital samples at a symbol rate T from the equalized signal from equalizer 710. Sampling of the signal from equalizer 710 might be synchronous using the timing information from a digital phase-locked loop (DPLL, not shown in FIG. 7) when servo SAM, Gray, and demodulation burst data are read, but might be asynchronous when RRO data is read.

The asynchronous sample sequence from A/D converter 711 is shown as a sequence of 'Y' values input to RRO detector 701. The sequence of 'Y' values from A/D converter 711 represent asynchronous sample values having an arbitrary phase for the RRO data field information.

RRO detector 701 comprises digital interpolator block 702, maximum-likelihood (ML) RRO address mark (AM) detector 703, RRO data decoder 704, and optional best phase (BP) detector 705. Digital interpolator block 702 may comprise one or more digital interpolators, each interpolator interpolating the sequence of 'Y' values from A/D converter 711 to generate a corresponding interpolated sample sequence having a different phase from the phase of asynchronous sample values. ML RRO AM detector 703 detects an RRO AM in the sequence of 'Y' values. Digital interpolator block 702 provides M sample sequences (M a positive integer): the asynchronous samples from A/D converter 711 with phase $\tau_0$, and M−1 different interpolated sample sequences with phases $\tau_1$ through $\tau_{M-1}$, respectively.

ML RRO AM detector 703 detects the RRO AM of the RRO data field (after the DC erase field) in one of the M sample sequences from digital interpolator block 702. ML RRO AM detector 703 employs an asynchronous maximum likelihood (AML) detection algorithm, such as a Viterbi algorithm, to detect the series of peaks of the RRO AM based on detection of the entire sequence of observed peaks, instead of on a peak-by-peak basis. AML detection of the RRO AM selects one of the M sample sequences from digital interpolator block 702 that is "closest" in, for example, Euclidean distance to the ideal RRO AM sample sequence. The relation "closest" may be expressed in different ways with respect to distance and a cost function, as described subsequently. Once the RRO AM is detected, ML RRO AM detector 703 provides a RRO AM-found signal r(k) as well as the selected one of the M sample sequences having the best phase (i.e., provides the best samples for detecting and decoding the RRO data).

For example, if a bit is encoded into three bits, detection and decoding of the middle bit is least likely to cause a bit error. Best phase selection is described in U.S. patent application Ser. No. 10/342,153 to Viswanath Annampedu and Pervez Aziz entitled "Asynchronous Servo RRO Detection Employing Interpolation," filed on Jan. 14, 2003, which is incorporated herein in its entirety by reference. Optionally, BP detector 705 may be employed to determine the best phase sample sequence, termed best samples, from digital interpolator block 702 for use by RRO data decoder 704. BP detector 705 employs the best phase information generated by ML RRO AM detector 703 during detection of the RRO addess mark.

Based on the RRO AM-found signal r(k) and a priori information about the RRO encoder's coding constraints, RRO data decoder 704 decodes the selected one of the M sample sequences corresponding to the best phase into RRO data. Operation of digital interpolator block 702, ML RRO AM detector 703, and RRO data decoder 704 in accordance with exemplary embodiments of the present invention is now described.

Digital interpolator block 702 receives, for example, four 'Y' values Y0, Y1, Y2, and Y3, which values are asynchronous samples from A/D converter 711 sampled at the symbol rate T. These samples need not correspond to peaks and zero crossings of the analog waveform input to A/D converter 711, and may be any samples that are spaced T apart in time. Using these four asynchronous samples, digital interpolator block 702 generates estimates for interpolated samples (e.g., Y11, Y12, and Y13). For example, the following filtering operations of equations (1) through (3) generate interpolated samples Y11, Y12, and Y13:

$$Y11=(-2*Y3+5*Y2+13*Y1-2*Y0)/16 \qquad (1)$$

$$Y12=(-2*Y3+9*Y2+9*Y1-2*Y0)/16 \qquad (2)$$

$$Y13=(-2*Y3+13*Y2+5*Y1-2*Y0)/16 \qquad (3)$$

Each of the filter operations represented by equations (1) through (3) is a digital interpolation. The term "16" in the denominator of equations (1)–(3) is a gain term employed to adjust the interpolated samples values to be compatible with 6-bit sample values from the A/D converter. Compatible samples should resemble samples of an oversampled signal passed to the A/D converter. Other embodiments may scale the original read samples (e.g., the denominator of equations (1), (2), and (3) becomes "4", and samples Y0, Y1, Y2, and Y3 are scaled by 4 prior to interpolation). Digital interpolator block 702 may comprise one digital interpolation filter for each of the sampling points to be interpolated (i.e., one interpolator per equation), though separate serial processing may also be employed (e.g., one interpolator implementing all equations). The present invention is not limited to these forms of filtering operations described in equations (1), (2), and (3), and one skilled in the art may employ other types of interpolation to generate interpolated samples.

Figure 8:
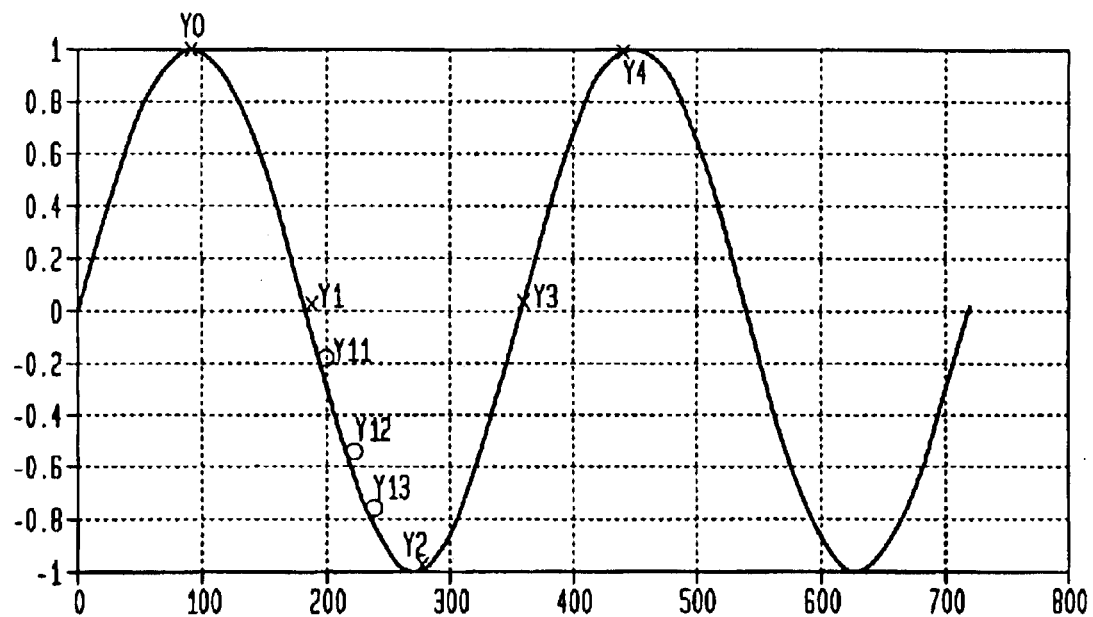
FIG. 8 shows a graph of a waveform including asynchronous sample points and interpolated sample points provided by the digital interpolator block of FIG. 7.

Interpolated sample Y11 corresponds to a sample that is spaced T/4 after the asynchronous sample Y1. Similarly, interpolated samples Y12 and Y13 are spaced T/2 and 3T/4 after Y1, respectively. Thus, if sample Y1 corresponds to a time kT, then sample Y11 corresponds to Y1 (kT+T/4), sample Y12 corresponds to Y1 (kT+T/2), sample Y13 corresponds to Y1(kT+3T/4), and sample Y2 corresponds to Y1(kT+7). FIG. 8 shows a graph of a waveform applied to the A/D converter including i) asynchronous sample points Y1 and Y2 and ii) interpolated sample points Y11, Y12, and Y13. After accounting for inherent filter and implementation delays, digital interpolator block 702 generates a continuous stream of samples, which are T/4 apart from each other. Alternatively, over-sampling may be employed to generate a similar continuous stream of samples, but involves increasing the speed (clock frequency) of A/D converter 711 by four.

The present invention is not limited to samples spaced T/4 apart, and additional interpolators may be employed to estimate sample points at other sampling instances. For example, to estimate samples with a T/8 resolution (i.e., spacing between two samples is T/8), seven interpolators are employed to generate interpolated samples used in addition to the asynchronous samples from A/D converter 711. Possible filter coefficients for these seven digital interpolators are given in Table 1 below:

TABLE 1

| Interpolation at | Simple Digital Filters (Number of Taps: 4) | | | |
|---|---|---|---|---|
| T/8 | −1/16 | 2/16 | 15/16 | −1/16 |
| T/4 | −2/16 | 5/16 | 13/16 | −2/16 |
| 3T/8 | −2/16 | 7/16 | 11/16 | −2/16 |
| T/2 | −2/16 | 9/16 | 9/16 | −2/16 |
| 5T/8 | −2/16 | 11/16 | 7/16 | −2/16 |

TABLE 1-continued

| Interpolation at | Simple Digital Filters (Number of Taps: 4) | | | |
|---|---|---|---|---|
| 3T/4 | −2/16 | 13/16 | 5/16 | −2/16 |
| 7T/8 | −1/16 | 15/16 | 2/16 | −1/16 |

In accordance with exemplary embodiments of the present invention, the asynchronous sample sequence from A/D converter 711 and M−1 interpolated sample sequences are applied to ML RRO AM detector 703. ML RRO AM detector 703 applies the AML detection algorithm to detect the series of peaks of the RRO AM based on detection of the entire sequence of observed peaks. The AML detection algorithm selects either i) the asynchronous samples from the A/D or ii) samples of one of the sets of interpolated samples that are closest in, for example, Euclidean distance to the ideal RRO AM sample sequence. The relation closest may be expressed in different ways with respect to the minimization of a cost function, such as minimized square of the Euclidean distance or minimized absolute value of Euclidean distance, where Euclidean distance $e_m(k)$ between an observed sample $y(k)$ and ideal sample $\hat{y}(k)$ at time k is as given in equation (4):

$$e_m(k)=(y(k)-\hat{y}(k)) \qquad (4)$$

For asynchronous sampling with period T, which is equivalent to the symbol period, the squared Euclidean distance for one peak of the mth phase with respect to the phase of asynchronous samples at time k is as given in equation (5):

$$e_m^2(k)=(y(kT+\tau_m)-\hat{y}(kT))^2. \qquad (5)$$

A given implementation of RRO AM detector 703, as well as a given implementation of RRO data decoder 704, is based on the type of encoding employed by the RRO AM and RRO data encoder(s). For the RRO AM encoding, a given input bit may be repeated or translated to a codeword of length NT bits, and thus peaks are spaced NT apart. In addition, the number B is defined as the total number of positive peaks (and also the total number of negative peaks) in the RRO AM.

For example, if the RRO AM and data encoder is a 1/4 encoder that receives an input bit and generates four output bits, such as the encoding: "0" becomes "0011" and "1" becomes "1100", then the peaks are spaced 4T apart. Thus, the summed square $d_m^2(k)$ of the Euclidean distance of the mth phase of sampling accounting for all B peaks spaced 4T apart is as given in equation (6):

$$d_m^2(k) = \sum_{b=0}^{B-1} (y(kT + \tau_m - 4Tb) - \hat{y}(kT - 4Tb))^2 \qquad (6)$$

The minimum square of the Euclidean distance is given in equation (7):

$$\min_{m,k} d_m^2(k) \qquad (7)$$

where $$\min_{m,k}(\cdot)$$

is the mathematical minimum of "●" computed for all m sequence phases at time k.

A detector is generally designed to operate with a given performance level, which may often be related to a given probability of error in detected values. Consequently, for a given implementation, ML RRO AM detector 703 selects either the asynchronous sample sequence or one of the interpolated sample sequences provided that the minimized square of the Euclidean distance is less than a predefined threshold thr, as given in equation (8):

$$\min_{m,k} d_m^2(k), \text{ such that } d_m^2(k) < thr, \qquad (8)$$

where threshold thr might be determined through calculation or through observation of real and/or simulated systems. Initially, a variable t(k) is set to "0", and when $d_m^2(k)<thr$, the variable t(k) is set to "1".

For example, RRO detector 701 may employ three interpolators for digital interpolator block 702. Thus, m={0,1,2,3}, and digital interpolator block 702 provides four sample sequences with phases $\tau_m$: the asynchronous samples from A/D converter 711 with phase $\tau_0$, and three different interpolated sample sequences with phases $\tau_1=T/4$, $\tau_2=T/2$, and $\tau_3=3T/4$, respectively. ML RRO AM detector 703 evaluates expression (6) over all sample sequences, declaring a tentative RRO AM detection when expression (8) is true. ML RRO AM detector 703 may or may not set the RRO AM-found signal r(k) based on the tentative decision. For some embodiments, the first occurrence of $d_m^2(k)$ falling below threshold thr might not correspond to a sample sequence of phase $\tau_m$ being the best phase sample sequence. Consequently, for some embodiments, ML RRO AM detector 703 evaluates equation (8) over all sample sequences during another clock cycle. The RRO AM-found signal r(k) is set based on the decision rule of equation (9):

$$r(k) = \begin{cases} t(k) & \text{if } d_{m_k}^2(k) \le d_{m_{k-1}}^2(k-1) \\ t(k-1) & \text{if } d_{m_k}^2(k) > d_{m_{k-1}}^2(k-1) \end{cases} \qquad (9)$$

where $m_k$ corresponds to the phase number of the minimum square of the Euclidean distance at time k, and $m_{k-1}$ corresponds to the phase number of the minimum square of the Euclidean distance at time k−1. As would be apparent to one skilled in the art, equation (6) may be modified to account for peaks that are more or less than 4T apart, as shown in the expression of equation (10):

$$d_m^2(k) = \sum_{b=0}^{B-1} (y(kT+\tau_m - S_bTb) - \hat{y}(kT - S_bTb))^2 \qquad (10)$$

where $S_b$ is the separation of the bth peak sample from the prior peak sample. For example, a peak separation of 5T (and $S_b$=5) may be advantageous for enhanced detection of EPR4 target channel responses.

Figure 9:
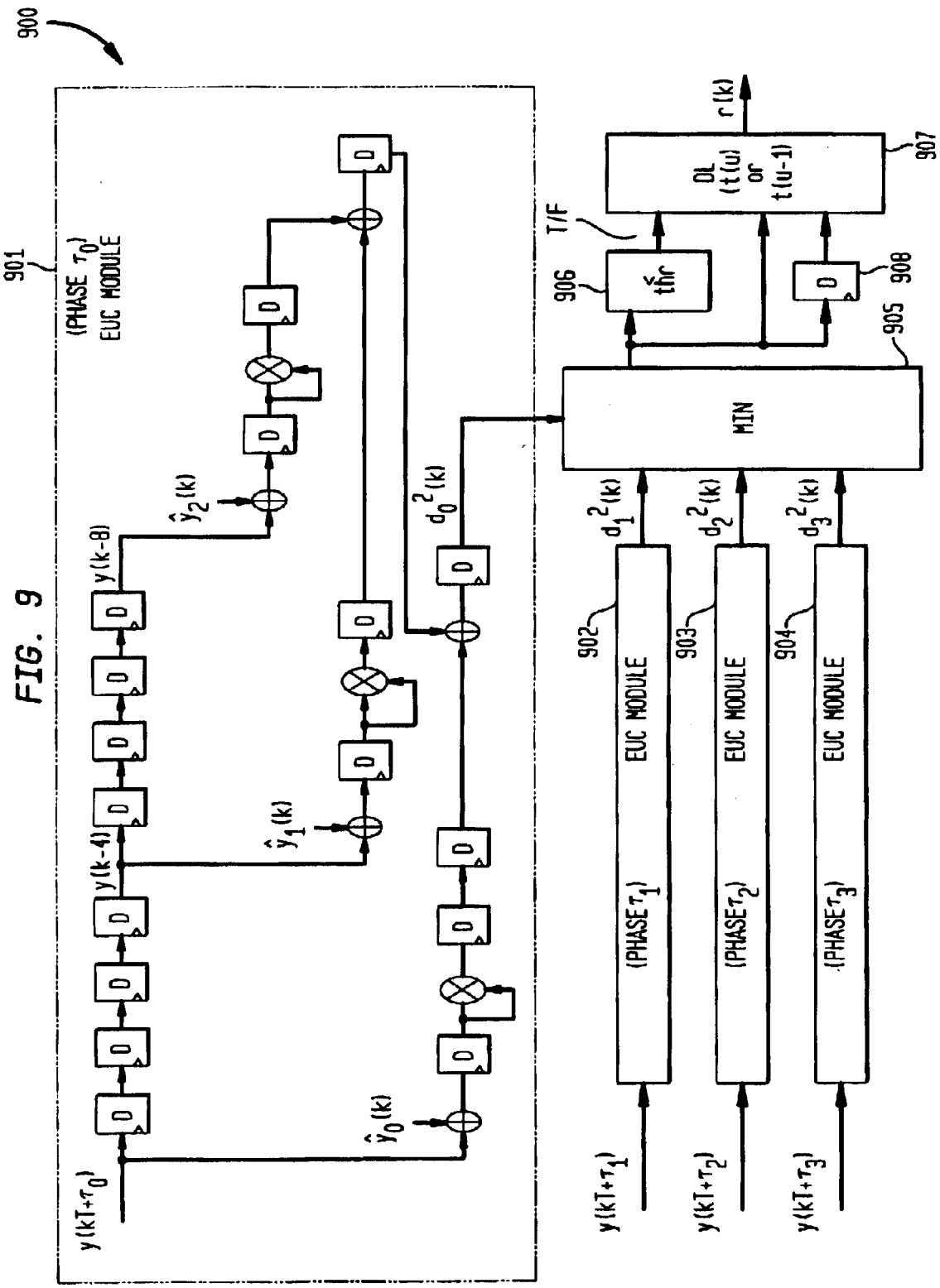
FIG. 9 shows a first exemplary implementation of the RRO AM detector of FIG. 7.

FIG. 9 shows a first exemplary implementation 900 of ML RRO AM detector 703 of FIG. 7. ML RRO AM detector 900 processes four sample sequences from digital interpolator block 702: the asynchronous samples (y(kT+$\tau_0$)) from A/D converter 711, and three different interpolated sample sequences (y(kT+$\tau_1$), y(kT+$\tau_2$), and y(kT+$\tau_3$)). RRO AM detector 900 processes the four sample sequences in accordance with the relations of equations (6) through (9), using the ideal sample values for $\hat{y}_b(k)$, where subscript b denotes the peak number. Table 2 gives relatively ideal sample values for $\hat{y}_b(k)$ at peak values for an EPR4 channel response (i.e., EPR4 ([5 5 −5 −5])), where each bit (row) is spaced T apart in time. RRO AM&BP detector 900 processes this sequence to detect peak values (such as the peak values in Table 2).

TABLE 2

| Bits | Ideal Y |
|------|---------|
| 0 | |
| 0 | |
| 1 | |
| 1 | 20 |
| 0 | |
| 0 | |
| 1 | |
| 1 | 20 |
| 1 | |
| 1 | |
| 0 | |
| 0 | −20 |
| 1 | |
| 1 | |
| 0 | |
| 0 | −20 |
| 1 | |
| 1 | |
| 1 | 20 |
| 1 | |
| 1 | |
| 0 | |
| 0 | |
| 0 | −20 |

ML RRO AM detector 900 comprises four Euclidean (EUC) distance modules 901–904, min calculator 905, threshold detector 906, delay 908, and decision logic 907. Each of EUC modules 901–904 implements the squared Euclidean distance calculation for a corresponding sample sequence as given in equation (6). An implementation for sample sequence phase $\tau_0$ (e.g., the asynchronous sample sequence from A/D converter 711) is shown in FIG. 9 as EUC module 901; EUC modules 902–904 for interpolated sample sequences having phases $\tau_1$–$\tau_3$ may be implemented in a similar manner. In the figures, addition is shown by a "⊕" element (a combiner, e.g., as either an adder or a subtractor), multiplication is shown by a "⊗" element (e.g., a multiplier), and delay "D" of one sample time is shown by a D element (e.g., a flip-flop). The implementation shown in FIG. 9 is a pipeline processing implementation, where delay elements are employed to account for a clock cycle of processing and possible propagation delay through delay chains.

EUC modules 901–904 generate squared Euclidean distances $d_0^2(k)$ through $d_3^2(k)$ for the four sample sequences, and min calculator 905 determines the minimum value of squared Euclidean distances $d_0^2(k)$ through $d_3^2(k)$, implementing the calculation of equation (7). The minimum value of squared Euclidean distances $d_0^2(k)$ through $d_3^2(k)$ is applied to threshold detector 906 to determine whether the minimum value at time k is less than the threshold thr, implementing the calculation of equation (8). Threshold detector 906 generates a true or false (T/F) signal based on the threshold comparison. Delay 908 is employed to provide the minimum value of squared Euclidean distances at time k−1. Decision logic 907 compares the minimum values at time k and k−1 to generate the RRO AM-found signal r(k) to indicate that the RRO AM is detected, implementing the calculation of equations (8) and (9) using the T/F of threshold detector 906. When the RRO AM-found signal r(k) indicates that the RRO AM is detected, the sample sequence having the phase $\tau_m$ corresponding to the minimum squared Euclidean distance might correspond to the best phase, and either subsequent asynchronous or interpolated sample sequences having this phase might be employed as best samples for RRO data detection and decoding by RRO data decoder 704 (FIG. 7).

Another exemplary embodiment of the present invention employs an absolute metric for Euclidean distance instead of the square of the Euclidean distance. For example, the absolute value of the Euclidean distance, $da_m(k)$, may be expressed as in equation (11):

$$da_m(k) = \sum_{b=0}^{B-1} |y(kT + \tau_m - S_bTb) - \hat{y}(kT - S_bTb)|, \quad (11)$$

and equations (7), (8), and (9) may be modified by substituting $da_m(k)$ for $d_m^2(k)$.

Figure 10:
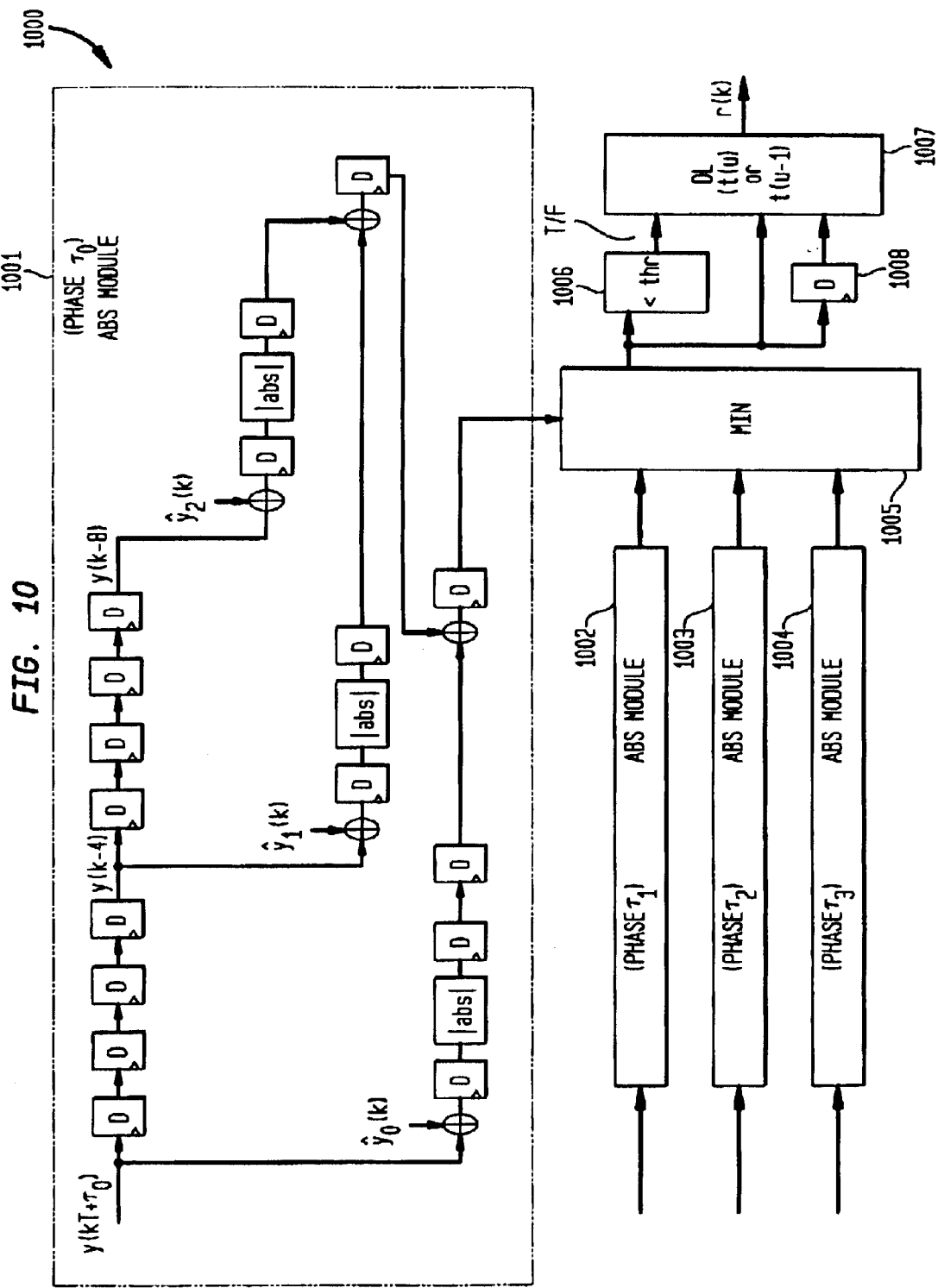
FIG. 10 shows a second exemplary implementation of the RRO AM detector of FIG. 7.

FIG. 10 shows a second exemplary implementation 1000 of the RRO AM detector 703 of FIG. 7 employing the absolute of the Euclidean distance, $da_m(k)$. The second exemplary implementation 1000 comprises four absolute (ABS) modules 1001–1004, min calculator 1005, threshold detector 1006, delay 1008, and decision logic 1007. Each of ABS modules 1001–1004 implements the absolute Euclidean distance calculation for a corresponding sample sequence as given in equation (11). An implementation for sample sequence phase $\tau_0$ (e.g., the asynchronous sample sequence from A/D converter 711) is shown in FIG. 10 as ABS module 1001; ABS modules 1002–1004 for interpolated sample sequences having phases $\tau_1$–$\tau_3$ may be implemented in a similar manner. The implementation shown in FIG. 10 is a pipeline processing implementation, where delay elements are employed to account for a clock cycle of processing and possible propagation delay through delay chains. In ABS module 1001, each |abs| element generates the absolute value of the input value.

ABS modules 1001–1004 generate absolute Euclidean distances $da_0(k)$ through $da_1(k)$ for the four sample sequences, and min calculator 1005 determines the minimum value of absolute Euclidean distances $da_0(k)$ through $da_1(k)$, implementing a calculation similar to that of equation (7). The minimum value of absolute Euclidean distances $da_0(k)$ through $da_1(k)$ is applied to threshold detector 1006 to determine whether the minimum value of absolute Euclidean distances at time k is less than the threshold thr, implementing a calculation similar to that of equation (8). Delay 1008 is employed to generate the minimum value of absolute Euclidean distances at time k−1. Decision logic 1007 compares the minimum values at time k and k−1 to generate the RRO AM-found signal r(k) to indicate that the RRO AM is detected, implementing a calculation similar to that of equation (9). When the RRO AM found-signal r(k) indicates that the RRO AM is detected, the sample sequence having the phase $\tau_m$ corresponding to the minimum absolute Euclidean distance might correspond to the best phase (BP), and the corresponding best samples may be employed for RRO data detection and decoding by RRO data decoder 704 (FIG. 7).

Returning to FIG. 7, RRO data decoder 704 is employed to detect and decode the RRO data from the BP sequence of samples, or best samples, from ML RRO AM detector 703. Decoding by RRO data decoder 704 depends on the RRO data encoder (not shown in FIG. 7) employed to encode the RRO data. The following describes detection for two exemplary forms of encoding and methods for decoding, though one skilled in the art may readily extend the teachings herein to other encoders based on the constraints of the particular encoder. RRO data detection may generally be asynchronous data detection.

The first exemplary encoder is the 1/4 encoder employed for the RRO data encoder as previously described. The 1/4 encoder receives an input bit and generates 4 output bits as follows: "0" becomes "0011" and "1" becomes "1100." Such an encoder is also referred to as a Wide Biphase encoder. For this encoder, at every 4T (i.e., at every word boundary), there is either a positive peak or a negative peak. The value of the peak is ±20 for an EPR4 target partial response. Thus, for this encoder, the data bit may be asynchronously detected as follows. First, the best sample Y(BP+n4T+4T) is retrieved (n being an integer to count every 4T from the best phase selected during the last peak of the RRO address mark detection). The retrieved sample is compared to a threshold of zero. If the sample is greater than zero, then the RRO data bit is declared a "0", else, the RRO data bit is declared a "1".

A second exemplary RRO data encoder is a 2/8 encoder which receives two input bits and generates eight output bits, as shown in Table 3 below. Also shown in Table 3 are corresponding ideal values of $\hat{y}_b(k)$ (as Y1 through Y8) for an EPR4 target partial response for all combinations of input bits.

TABLE 3

| Input bits | Coded bits | Y1 | Y2 | Y3 | Y4 | Y5 | Y6 | Y7 | Y8 |
|---|---|---|---|---|---|---|---|---|---|
| 00 | 00111100 | X | X | X | 20 | 10 | 0 | −10 | −20 |
| 11 | 11000011 | X | X | X | −20 | −10 | 0 | 10 | 20 |
| 01 | 00001111 | X | X | X | 0 | 10 | 20 | 10 | 0 |
| 10 | 11110000 | X | X | X | 0 | −10 | −20 | −10 | 0 |

A 2/8 encoder has a word boundary of 8 bits. Thus, at the end of every 8 bits, the following operation is repeated until all the RRO data bits are detected. First, the best samples Y(BP+n8T+4T), Y(BP+n8T+5T), Y(BP+n8T+6T), Y(BP+n8T+7T), and Y(BP+n8T+8T) are retrieved (n being an integer to count every 4T from the best phase selected during the last peak of the RRO address mark detection). These values are compared to corresponding ideal values such as given in Table 3. The comparison includes computation of corresponding "metrics" that may be defined based on the 2/8 data encoder and its constraints. For example, one such metric may be a computed sum of absolute errors between the best samples and the sequence of ideal values. The best metric for this case might be the minimum of those computed sums. Codewords corresponding to the best metric might be decoded as the RRO data.

While the exemplary embodiments are described for samples spaced T/4 apart with a 1/4 encoded RRO AM, the present invention is not so limited. One skilled in the art may modify the teachings herein for 1) any number of interpolators and 2) any RRO address mark pattern containing positive and negative peaks (e.g., a pattern characterized by transitions). In addition, while the present invention is described employing an EPR4 ([5 5 −5 −5]) target partial channel response with peak values of 20 and −20, the present invention is not so limited. One skilled in the art may extend the teachings herein to other target channel responses of different peak values.

While the present invention is described for detection and decoding of encoded RRO data from a magnetic recording medium, the present invention is not so limited. One skilled in the art may readily extend the teachings herein to sampled data read from other types of recording media, such as optical recording media. In addition, while the following exemplary embodiments are described for asynchronously sampled servo RRO data detection, the techniques described herein may be employed for synchronously sampled servo RRO data detection as well.

A receiver employing one or more embodiments of the present invention may have substantially improved detection performance for asynchronously sampled servo RRO information. For some exemplary implementations, the receiver may experience approximately 0.4 dB gain in RRO data error rate and 3 dB gain in RRO address mark miss rate when compared to systems employing detection on a peak-by-peak basis. A receiver using digital interpolators replaces higher speed (and higher cost) sampling circuitry that may be employed to over-sample the analog signal.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. An apparatus for detecting data in a sample sequence read from a recording channel, the apparatus comprising:
   an interpolator adapted to generate one or more interpolated sample sequences from the read sample sequence, wherein each interpolated sample sequence has a different corresponding phase relative to the read sample sequence; and
   a maximum-likelihood (ML) detector adapted to:
   1) generate a distance measure between a portion of each sample sequence and an ideal sample sequence, wherein the ideal sample sequence corresponds to peaks in the data, and
   2) select either the read sample sequence or one of the interpolated sample sequences based on the minimum distance measures for use in detecting the data.

2. The invention as recited in claim 1, wherein the ML detector is adapted to determine the minimum of the distance measures to select either the read sample sequence or one of the interpolated sample sequences for use in detecting the data.

3. The invention as recited in claim 1, wherein the data is servo data comprising an address mark and an encoded data field.

4. The invention as recited in claim 3, wherein the ML detector detects the address mark from the selected sample sequence, and wherein the apparatus further comprises:
   a decoder adapted to decode the encoded data from the sample sequence selected by the detector.

5. The invention as recited in claim 4, wherein the decoder employs constraints of an encoder employed to generate the encoded data.

6. The invention as recited in claim 5, wherein the encoder is either a 2/8 encoder or a 1/4 encoder.

7. The invention as recited in claim 3, wherein the address mark is a repeatable run out (RRO) address mark and encoded data is encoded RRO data.

8. The invention as recited in claim 1, wherein the read samples are asynchronous samples.

9. The invention as recited in claim 1, wherein the distance measure is a Euclidean distance between the portion of each sample sequence and an ideal sample sequence.

10. The invention as recited in claim 9, wherein the ML detector is adapted to determine the minimum of the squared Euclidean distance between the portion of each sample sequence and an ideal sample sequence.

11. The invention as recited in claim 10, wherein the ML detector determines the minimum of the squared Euclidean distance $d_m^2(k)$ at time k as:

$$\min_{m,k} d_m^2(k) = \min_{m,k} \sum_{b=0}^{B-1} (y(kT + \tau_m - S_b Tb) - \hat{y}(kT - S_b Tb))^2$$

where $y(\bullet)$ is either an observed sample or an interpolated sample, $\hat{y}(\bullet)$ is an ideal sample, B is a positive integer corresponding to a number of peaks, T is a symbol period, $S_b$ is a separation of the bth peak sample from the prior peak sample ($0 \leq b \leq B$), and $\tau_m$ is a phase of either the read sample sequence or one of the interpolated sample sequences (m an integer, $0 \leq m \leq M$, and M a positive integer corresponding to the number of sample sequences).

12. The invention as recited in claim 9, wherein the ML detector is adapted to determine the minimum of the absolute Euclidean distance between the portion of each sample sequence and an ideal sample sequence.

13. The invention as recited in claim 10, wherein the ML detector determines the minimum of the absolute Euclidean distance $da_m(k)$ at time k as:

$$\min_{m,k} da_m(k) = \min_{m,k} \sum_{b=0}^{B-1} |y(kT + \tau_m - S_b Tb) - \hat{y}(kT - S_b Tb)|$$

where $y(\bullet)$ is either an observed sample or an interpolated sample, $\hat{y}(\bullet)$ is an ideal sample, B is a positive integer corresponding to a number of peaks, T is a symbol period, $S_b$ is a separation of the bth peak sample from the prior peak sample ($0 \leq b \leq B$), and $\tau_m$ is a phase of either the read sample sequence or one of the interpolated sample sequences (m an integer, $0 \leq m \leq M$, and M a positive integer corresponding to the number of sample sequences).

14. The invention as recited in claim 9, wherein the ML detector is further adapted to select the minimum of the Euclidean distance when the minimum is less than a threshold value.

15. The invention as recited in claim 14, wherein the ML detector selects either the minimum of the Euclidean distance for a current time k or for a previous time k-1.

16. The invention as recited in claim 14, wherein the threshold value is selected based on a probability of error of detection.

17. The invention as recited in claim 1, wherein the apparatus is embodied in an integrated circuit.

18. The invention as recited in claim 1, wherein the apparatus is implemented in a read channel component of either a magnetic recording system or an optical recording system.

19. A method of detecting data in a sample sequence read from a recording channel comprising the steps of:
   (a) generating one or more interpolated sample sequences from the read sample sequence, wherein each interpolated sample sequence has a different corresponding phase relative to the read sample sequence;
   (b) generating, by a maximum-likelihood (ML) detection algorithm, a distance measure between a portion of each sample sequence and an ideal sample sequence, wherein the ideal sample sequence corresponds to peaks in the data; and (c) selecting either the read sample sequence or one of the interpolated sample sequences based on the minimum distance measure for use in detecting the data.

20. The invention as recited in claim 19, wherein step (c) comprises the step of determining the minimum of the distance measures to select either the read sample sequence or one of the interpolated sample sequences for use in detecting the data.

21. The invention as recited in claim 19, wherein, for step (c), the data is servo data comprising an address mark and an encoded data field.

22. The invention as recited in claim 21, wherein step (c) comprises the step of detecting the address mark from the selected sample sequence, and wherein the method further comprises the steps of:

decoding the encoded data from the selected sample sequence.

23. The invention as recited in claim 22, wherein the decoding step employs constraints of an encoder employed to generate the encoded data.

24. The invention as recited in claim 23, wherein the encoder is either a 2/8 encoder or a 1/4 encoder.

25. The invention as recited in claim 21, wherein, for step (c), the address mark is a repeatable run out (RRO) address mark and encoded data is encoded RRO data.

26. The invention as recited in claim 19, wherein, for step (a), the read samples are asynchronous samples.

27. The invention as recited in claim 19, wherein, for step (c), the distance measure is a Euclidean distance between the portion of each sample sequence and an ideal sample sequence.

28. The invention as recited in claim 27, wherein step (c) includes the step of determining the minimum of the squared Euclidean distance between the portion of each sample sequence and an ideal sample sequence.

29. The invention as recited in claim 28, wherein step (c) includes the step of determining the minimum of the squared Euclidean distance $d_m^2(k)$ at time k as:

$$\min_{m,k} d_m^2(k) = \min_{m,k} \sum_{b=0}^{B-1} (y(kT + \tau_m - S_b Tb) - \hat{y}(kT - S_b Tb))^2$$

where y(●) is either an observed sample or an interpolated sample, ŷ(●) is an ideal sample, B is a positive integer corresponding to a number of peaks, T is a symbol period, $S_b$ is a separation of the bth peak sample from the prior peak sample (0≦b≦B), and $\tau_m$ is a phase of either the read sample sequence or one of the interpolated sample sequences (m an integer, 0≦m≦M, and M a positive integer corrsponding to the number of sample sequences).

30. The invention as recited in claim 27, wherein step (c) comprises the step of determining the minimum of the absolute Euclidean distance between the portion of each sample sequence and an ideal sample sequence.

31. The invention as recited in claim 30, wherein step (c) comprises the step of determining the minimum of the absolute Euclidean distance $da_m(k)$ at time k as:

$$\min_{m,k} da_m(k) = \min_{m,k} \sum_{b=0}^{B-1} |y(kT + \tau_m - S_b Tb) - \hat{y}(kT - S_b Tb)|$$

where y(●) is either an observed sample or an interpolated sample, ŷ(●) is an ideal sample, B is a positive integer corresponding to a number of peaks, T is a symbol period, $S_b$ is a separation of the bth peak sample from the prior peak sample (0≦b≦B), and $\tau_m$ is a phase of either the read sample sequence or one of the interpolated sample sequences (m an integer, 0≦m≦M, and M a positive integer corresponding to the number of sample sequences).

32. The invention as recited in claim 27, wherein step (c) comprises the step of selecting the minimum of the Euclidean distance when the minimum is less than a threshold value.

33. The invention as recited in claim 32, wherein step (c) comprises the step of selecting either the minimum of the Euclidean distance for a current time k or for a previous time k−1.

34. The invention as recited in claim 32, wherein the threshold value is selected based on a probability of error of detection.

35. The invention as recited in claim 19, wherein the method is embodied by a processor of an integrated circuit.

36. The invention as recited in claim 19, wherein the method is implemented by a processor in a read channel component.

37. A computer-readable medium having stored thereon a plurality of instructions, the plurality of instructions including instructions which, when executed by a processor, cause the processor to implement a method for detecting data in a sample sequence read from a recording channel, the method comprising the steps of:

(a) generating one or more interpolated sample sequences from the read sample sequence, wherein each interpolated sample sequence has a different corresponding phase relative to the read sample sequence;

(b) generating, by a maximum-likelihood (ML) detection algorithm, a distance measure between a portion of each sample sequence and an ideal sample sequence, wherein the ideal sample sequence corresponds to peaks in the data; and (c) selecting either the read sample sequence or one of the interpolated sample sequences based on the minimum distance measure for use in detecting the data.

* * * * *